US009799087B2

(12) United States Patent
Fam et al.

(10) Patent No.: US 9,799,087 B2
(45) Date of Patent: Oct. 24, 2017

(54) SHADER PROGRAM PROFILER

(71) Applicant: Apple Inc., Cupertino, CA (US)

(72) Inventors: Sun Tjen Fam, Cupertino, CA (US); Andrew Sowerby, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 14/021,626

(22) Filed: Sep. 9, 2013

(65) Prior Publication Data

US 2015/0070367 A1 Mar. 12, 2015

(51) Int. Cl.
G06T 1/20 (2006.01)
G06T 1/60 (2006.01)

(52) U.S. Cl.
CPC ..................................... *G06T 1/20* (2013.01)

(58) Field of Classification Search
CPC ....... G06T 15/80; H04N 19/192; G06F 8/456; G06F 2201/865; G06F 9/325; G06F 11/3466; G06F 11/3476; G06F 9/54; G06F 11/3664
See application file for complete search history.

(56) References Cited

U.S. PATENT DOCUMENTS

| 5,835,705 | A | 11/1998 | Larsen |
| 7,548,238 | B2 | 6/2009 | Berteig |
| 8,254,455 | B2 | 8/2012 | Wu |
| 8,462,166 | B2 | 6/2013 | Sowerby |
| 8,769,495 | B1 | 7/2014 | Gupta |
| 9,390,541 | B2 | 7/2016 | Hasselgren |
| 9,406,100 | B2 | 8/2016 | Akenine-Moller |
| 2005/0013705 | A1 | 1/2005 | Farkas |
| 2006/0090161 | A1 | 4/2006 | Bodas |
| 2007/0294681 | A1* | 12/2007 | Tuck ................... G06F 11/3404 717/149 |
| 2007/0300231 | A1 | 12/2007 | Aguilar |
| 2009/0089014 | A1 | 4/2009 | Silyaev |
| 2009/0189896 | A1 | 7/2009 | Jiao |
| 2010/0135418 | A1 | 6/2010 | Zhang |
| 2011/0084965 | A1* | 4/2011 | Gould ................... G06T 15/005 345/426 |
| 2011/0119672 | A1 | 5/2011 | Ramaraju |
| 2011/0289485 | A1 | 11/2011 | Mejdrich |
| 2012/0249564 | A1 | 10/2012 | Liu |
| 2012/0324248 | A1 | 12/2012 | Schluessler |
| 2013/0106881 | A1 | 5/2013 | Hendry |
| 2013/0113801 | A1 | 5/2013 | Monson |

(Continued)

*Primary Examiner* — Gregory J Tryder
*Assistant Examiner* — Yuehan Wang
(74) *Attorney, Agent, or Firm* — Blank Rome LLP

(57) ABSTRACT

Systems, methods, and computer readable media to improve the development of image processing intensive programs are described. In general, techniques are disclosed to non-intrusively monitor the run-time performance of shader programs on a graphics processing unit (GPU)—that is, to profile shader program execution. More particularly, GPU-based hardware threads may be configured to run in parallel too, and not interfere with, the execution environment of a GPU during shader program execution. When so configured, GPU hardware threads may be used to accurately characterize the run-time behavior of an application program's shader operations.

21 Claims, 9 Drawing Sheets

(56) References Cited

U.S. PATENT DOCUMENTS

| | | |
|---|---|---|
| 2013/0238938 A1* | 9/2013 | Baliga ................. G06F 11/3632 |
| | | 714/38.1 |
| 2014/0089699 A1 | 3/2014 | OConnor |
| 2014/0118375 A1* | 5/2014 | Abdalla ................ G06T 15/005 |
| | | 345/545 |
| 2014/0137131 A1 | 5/2014 | Dheap |
| 2014/0267345 A1 | 9/2014 | Toth |
| 2014/0292771 A1* | 10/2014 | Kubisch ................... G06T 1/20 |
| | | 345/501 |
| 2016/0019130 A1 | 1/2016 | Kruglick |

* cited by examiner

| | RENDER INDEX | DRAW-CALL INDEX | SHADER-1 START ADD. | SHADER-1 END ADD. | SHADER-2 START ADD. | SHADER-2 END ADD. | | SLOT PC CONTENTS | SLOT PC STATE |
|---|---|---|---|---|---|---|---|---|---|
| SAMPLE 1 | A | B | C | D | E | F | . | IDLE | IDLE |
| SAMPLE 2 | G | H | I | J | K | L | . | ACTIVE | ACTIVE |
| SAMPLE 3 | M | N | O | P | Q | R | . | WAITING | WAITING |
| SAMPLE 4 | S | T | U | V | W | X | . | WAITING | WAITING |
| SAMPLE 5 | Y | Z | AA | AB | AC | AD | . | ACTIVE | ACTIVE |
| SAMPLE 6 | AE | AF | AG | AH | AI | AJ | . | READY | READY |
| | . | . | . | . | . | . | . | . | . |
| SAMPLE K | ZU | ZV | ZW | ZX | ZY | ZZ | . | IDLE | IDLE |

FIG. 7B

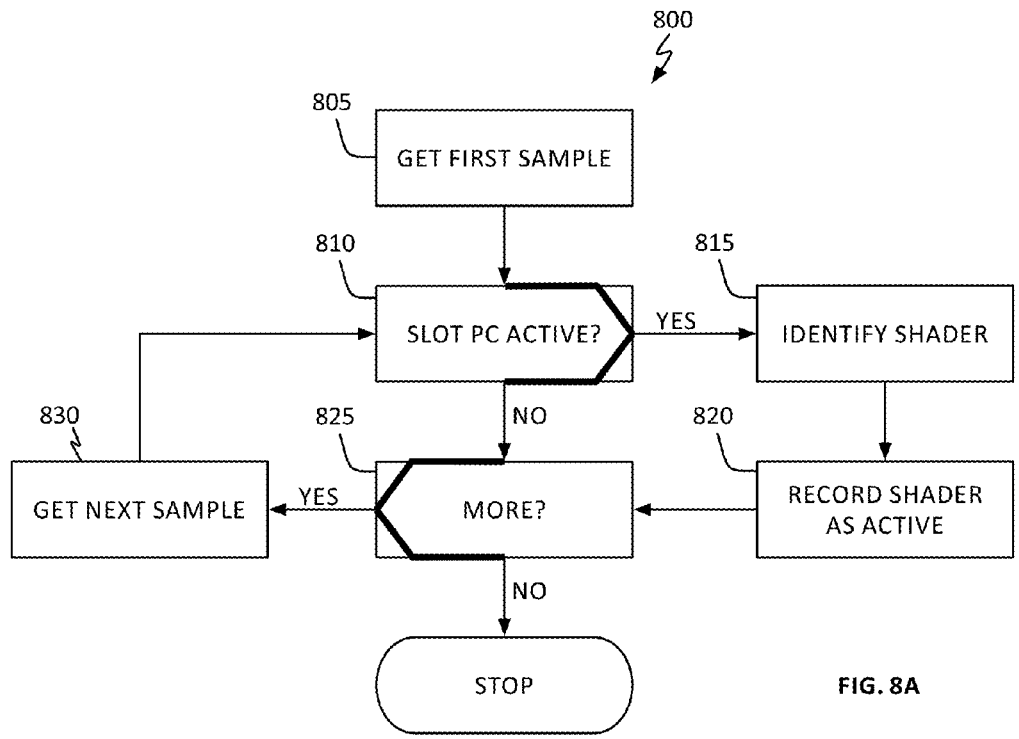

SHADER PROGRAM PROFILER

BACKGROUND

This disclosure relates generally to the field of graphics processing. More particularly, but not by way of limitation, this disclosure relates to methods for the non-intrusive monitoring of shader program execution during application development.

It is not uncommon to use host computer systems during the development of programs for mobile devices. At some point, however, it becomes necessary to execute such programs on the target platform. It is only then that the run-time performance/behavior of the program code may be determined. Many present-day portable device applications are graphics intensive. To support the needed graphics operations many portable devices incorporate one or more graphics processing units (GPUs). It can be particularly important to optimize shader program performance in such environments as one or a few inefficiently executing shader operations can have a noticeably deleterious effect on a program's overall behavior. For at least these reasons, it can be important to obtain accurate quantitative measurements of shader program run-time performance.

As used herein, the terms "shader program" or "shader" refer to programs specifically designed to execute on GPU hardware. Illustrative types of shader programs include vertex, geometry, tessellation (hull and domain) and fragment (or pixel) shaders. While the claimed subject matter is not so limited, at present only vertex and fragment shaders are supported by the OpenGL® ES standard—a well-known platform supporting the development of graphical applications on mobile platforms. (OPENGL is a registered trademark of Silicon Graphics, Inc.) In general, vertex shaders provide control over the position and other attributes in scenes involving three-dimensional (3D) models. In particular, vertex shaders transform each vertex's 3D position in virtual space to the corresponding two-dimensional (2D) coordinate at which it will appear on a screen. Output from a vertex shader may be sent directly to a rasterizer or to the next stage in a GPU's pipeline (e.g., a fragment shader). Fragment shaders, also known as pixel shaders, may be used to compute the color and other attributes of each pixel. Fragment shaders may, for example, be used to output a constant color or for the application of lighting values, shadows, specular highlights, and translucency.

SUMMARY

Techniques are disclosed to monitor, profile or characterize the run-time performance of shader programs on a graphics processing unit (GPU). In one embodiment, a method in accordance with this disclosure includes obtaining shader routines that, in the whole, correspond to a frame of information and then recording in memory a first index and an address for each of the shader programs. The first index may, for example, be a draw-call index and the address may include both a start and end memory address for each shader routine. The shader routines may then be executed by a GPU under control of a first hardware thread. In one embodiment, the same hardware thread may be programmed (via a microcode store, for example) may be configured to monitor shader operations. In another embodiment a second, independently executing, GPU hardware thread may be used to repeatedly sample the GPU's run-time environment. Illustrative sample metrics include GPU program counter contents and state. In yet another embodiment, the sample metrics may also include the render index of the shader routine corresponding to the program counter's contents. In some embodiments, after shader routine execution data has been obtained, additional frame generation operations may be made to determine a generation time for the frame. This time, and sampled shader run-time data may be used to determine the relative and absolute time used by each shader routine during frame generation. This information, in turn, may be used to identify inefficient shader routines which may then be optimized in accordance with the designer's objectives.

In one embodiment, the computational platform in which the GPU executes may be a mobile device such as a mobile telephone, tablet computer system, or a personal media device. Devices such as these may obtain shader routines from a host computer system (e.g., a workstation, desktop or laptop computer system). The mobile device may then prepare the shader routines and, in the process, identify the start and end address for each shader. In some embodiments, the mobile device may compile the shader routines with debug labels. Sampled shader run-time data may be communicated to a host computer system for analysis.

Embodiments of these basic ideas may be implemented as systems and programs or modules of computer readable software retained in non-transitory computer storage.

BRIEF DESCRIPTION OF THE DRAWINGS

FIGS. 7A and 7B show illustrative tables of run-time data.

FIG. 8A shows, in flow chart form, a data analysis operation in accordance with one embodiment.

FIGS. 8B and 8C show illustrative data analysis tables in accordance with one embodiment.

DETAILED DESCRIPTION

This disclosure pertains to systems, methods, and computer readable media to improve the development of graphics intensive programs. In general, techniques are disclosed to monitor the run-time performance of shader programs on a graphics processing unit (GPU)—that is, to profile shader program execution. More particularly, and in accordance with one embodiment, GPU-based hardware threads may be configured to run in parallel too, and not interfere with, the execution environment of a GPU during shader program execution. When so configured, GPU hardware threads may be used to accurately characterize the run-time behavior of an application program's shader operations. In another embodiment, a single GPU hardware thread may be configured to both manage the execution of shader programs and sample the GPU's running environment.

In the following description, for purposes of explanation, numerous specific details are set forth in order to provide a thorough understanding of the inventive concept. As part of this description, some of this disclosure's drawings represent structures and devices in block diagram form in order to avoid obscuring the operational details of various embodiments. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design, development and implementation of graphics-based software programs and systems.

Figure 1:
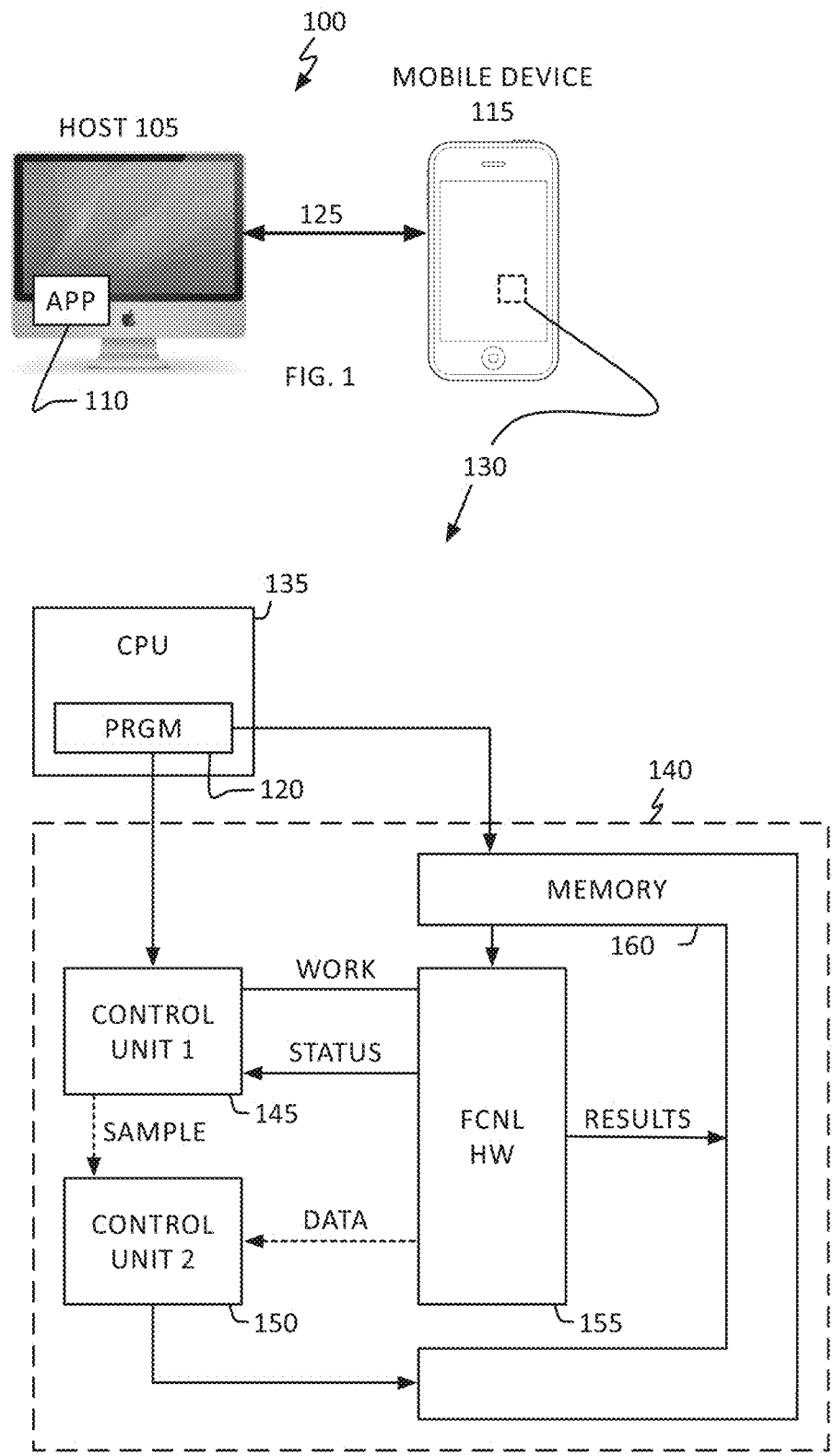
FIG. 1 shows, in block diagram form, a system in accordance with one embodiment.

Referring to FIG. 1, system 100 in accordance with one embodiment includes host computer system 105 executing host-side component 110 and mobile device 115 executing device-side component 120 coupled through communication link 125. Host computer 105 may, for example, be a server, workstation, desktop, laptop, or notebook computer system. Device 115 could, for example, be a mobile telephone, a portable entertainment device or a pad computer system. Host-side component 110 may be a single application, program, or code module or it may be embodied in a number of separate program modules. Likewise, device-side component may be embodied in one or more modules. Communication link 125 may employ any desired technology, wired or wireless. Incorporated within mobile device 115 may be computational functionality 130 that, in one embodiment, includes central processing unit (CPU) 135 and GPU 140. While CPU 135 and GPU 140 may be incorporated within a single unit as shown (dashed box 130), one of ordinary skill in the art will recognize that they could just as easily be separate devices coupled by one or more communication busses. Further, each of CPU 135 and GPU 140 may incorporate one or more separate computational units (e.g., cores).

As shown, illustrative GPU 140 includes control unit 1 145, control unit 2 150, GPU functional hardware 155 (e.g., shader execution units), and memory 160. In one embodiment, control unit 1 145 may be configured to implement a first hardware thread to manage and control the execution of shader programs on functional hardware 155 while control unit 2 150 may be configured to implement a second, independent hardware thread, to sample GPU state during shader execution. In another embodiment, control unit 1 145 may be configured to both manage shader execution and capture GPU state. As used herein, the term "hardware thread" refers to a sequence of control that executes on dedicated hardware.

A graphics-based program development operation in accordance with this disclosure can provide a sampling profiler of shader execution programs as they are processed by a device's GPU (e.g., GPU 140 in mobile device 115). The information obtained by such a profiler may be used to determine an accurate measure of how much time is spent during a frame rendering operation in each shader and draw-call.

Figure 2:
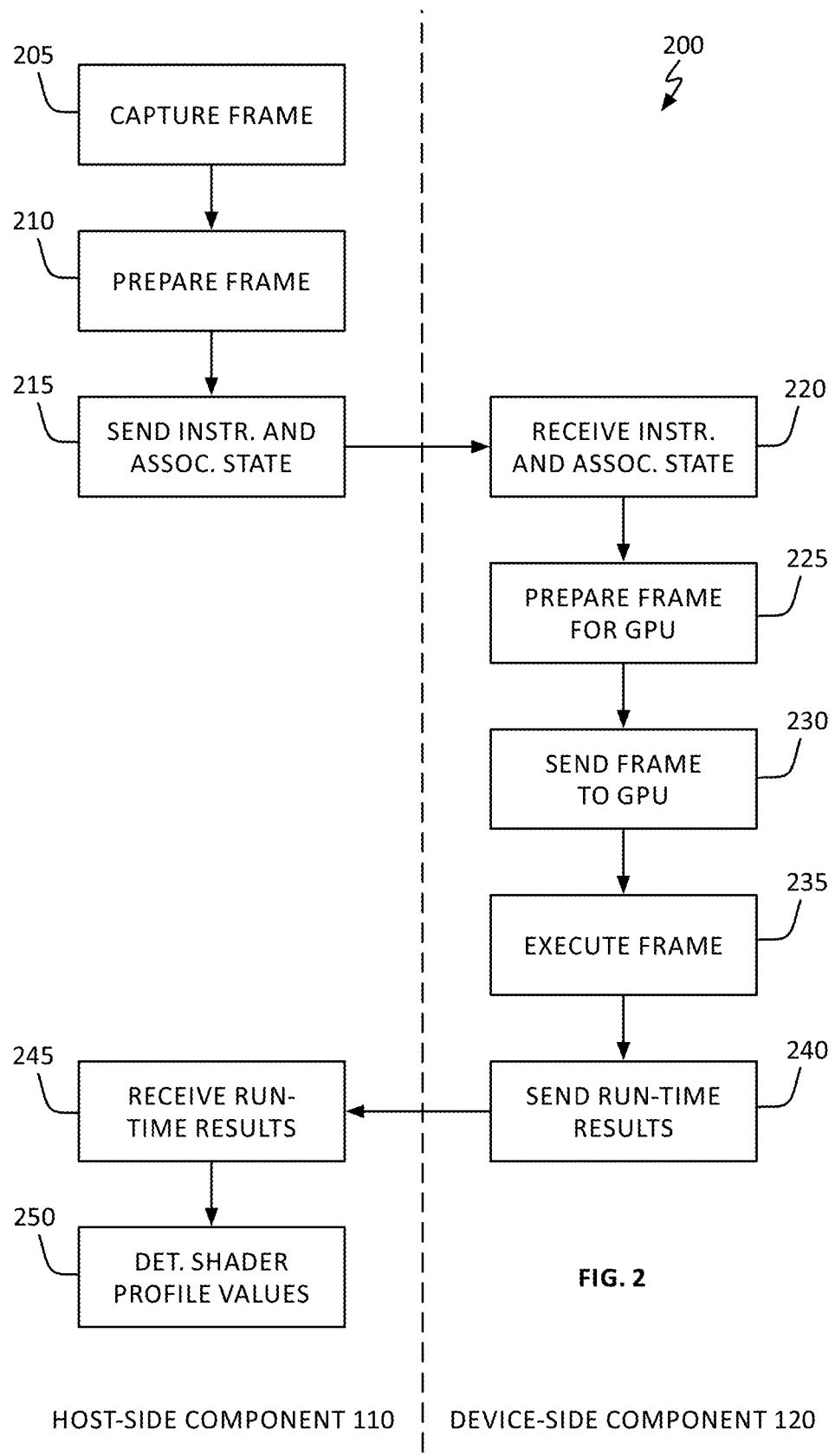
FIG. 2 shows, in flow chart form, a graphics-based program development operation in accordance with one embodiment.

Referring to FIG. 2, a high-level view of graphics-based program development operation 200 in accordance with one embodiment includes host-side and device-side components, 110 and 120 respectively (see FIG. 1). To begin, program development operation 200 captures a frame of graphics or, more simply, a frame (block 205). By "captured" it is meant that all of the instructions and, in one embodiment, OpenGL ES state to render a complete frame are identified and isolated. A frame, in turn, may be any designated region for display—often an entire screen, although this is not necessary. Once identified and isolated, the frame's instructions may be prepared for execution as described herein (block 210).

Figure 3:
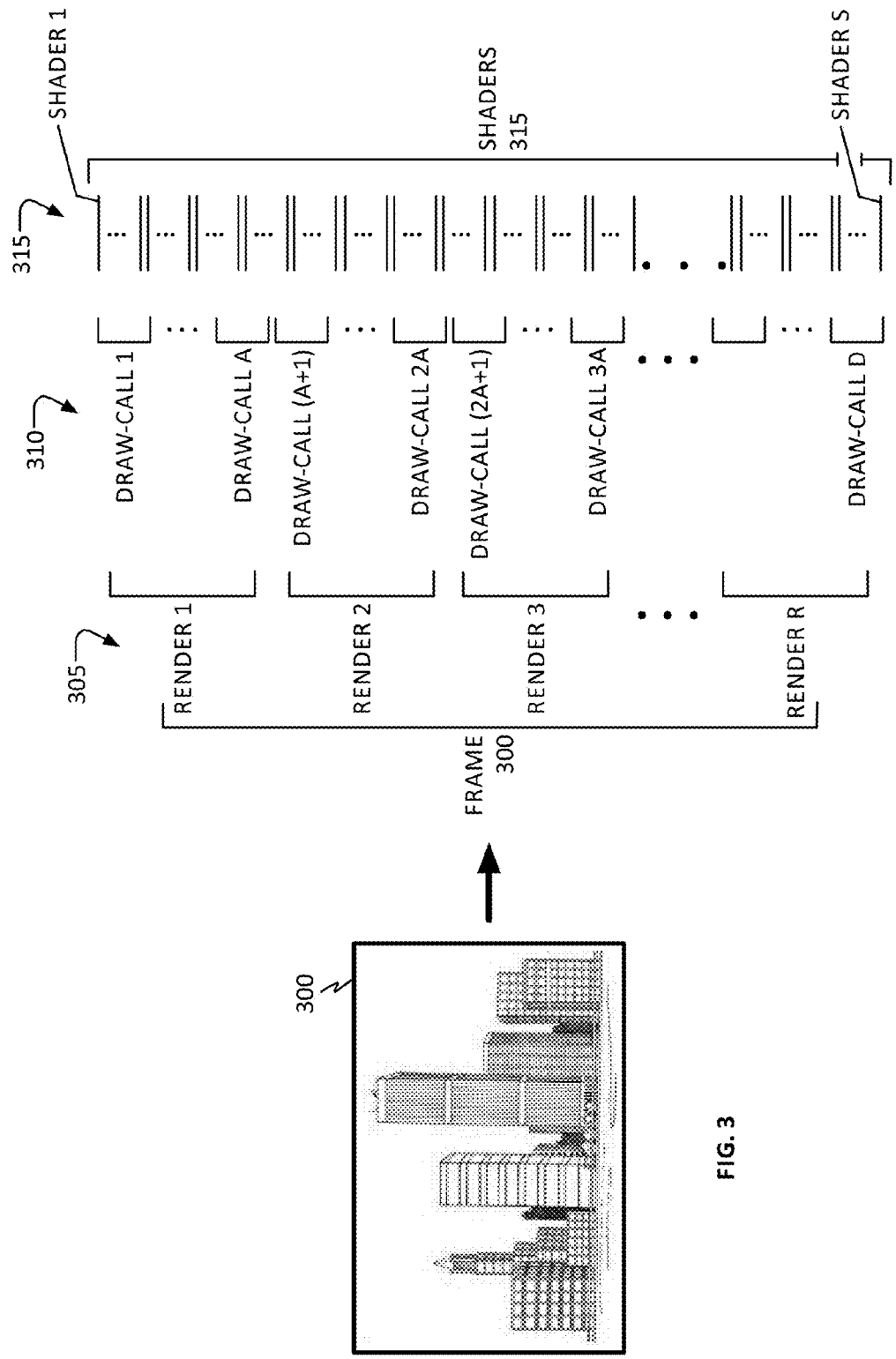
FIG. 3 shows the break-down of a frame into render phases, draw-calls, and shader programs in accordance with one embodiment.

Referring to FIG. 3, illustrative frame 300 is identified (block 205 in FIG. 2) and its corresponding instructions divided into one or more render phases 305, where each render phase includes one or more draw calls 310, and where each draw-call includes one or more shader programs 315 (block 210 in FIG. 2). Illustrative frame 300 comprises a sequence of R render phases, D draw calls, and S shader programs where each draw-call includes a number of shader programs. For illustrative purposes only, each draw-call will be taken to consist of two shader programs: a vertex shader followed by a fragment/pixel shader. One of ordinary skill in the art will recognize and understand that a draw-call in any given implementation may consist of fewer or more shader programs and, in some embodiments, may even vary from draw-call to draw-call.

Referring again to FIG. 2, host-side component 110 may next send groups of one or more instructions and their associated state information to device-side component 120 (block 215) and device-side component 120 may receive same (block 220). While the specific number of instructions transferred/received may vary from implementation to implementation, in one embodiment host-side component 110 sends one frame's worth of source code to device-side component 120. In another embodiment, host-side component 110 may send a render phase's worth of source code at one time. In still another embodiment, host-side component 110 sends source code instructions with further instructions to include debug labels during the source code's compilation. In yet another embodiment, host-side component 110 may send compiled code (with or without debug labels) to device-side component 120.

Figure 4:
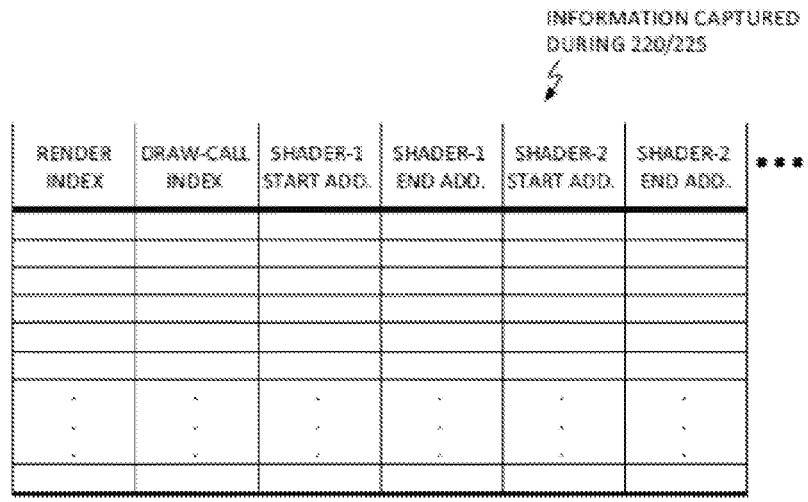
FIG. 4 shows a data capture table in accordance with one embodiment.

Once received, device-side component 120 prepares the frame for submission to GPU 140 (block 225). During this preparation, device-side component 120 may also capture certain information. Referring to FIG. 4, in one embodiment device-side component 120 may collect, for each shader program, its corresponding render index (e.g., 1→R), draw-call index (e.g., 1→D), start address, and end address (where the start and end addresses refer to locations in memory at which the shader programs are stored and from which they are executed by GPU 140). Because multiple draw-calls may use a single shader, each use may be given its own address range so that the captured sampling information (see below) may be used to determine the appropriate draw-call. In one embodiment, device-side component 120 may tag each instruction that is to be monitored where the tag may be identified and acted upon by GPU 140 (e.g., some or all of a frame's shader calls). In another embodiment, device-side component 120 may indicate to GPU 140 directly when to start monitoring operations and when to end them. One of ordinary skill in the art will understand there are many ways of causing shader monitoring operations to start and end. In one embodiment, device-side component 120 prepares an entire frame's worth of instructions before sending them to GPU 140 for execution (block 230). In another embodiment, device-side component 120 prepares a render phase's worth of instructions. In still another embodiment, device-side component 120 prepares some number of draw-calls worth of instructions before beginning to send them to GPU 140.

Returning to FIG. 1, in the illustrative embodiment device-side component 120 instructs control unit 1 145 to begin dispatching work to GPU 140's functional circuitry/shader execution units (block 235). Control unit 1 145 supports execution of a first hardware thread. In one embodiment, when a shader that has been tagged or designated for sampling is detected, control unit 1 145 may periodically obtain state information during the shader's execution by functional circuit 155 (e.g., shader execution units). In another embodiment, when a shader that has been tagged or designated for sampling is detected, control unit 2 150 may be used to support execution of a second hardware thread. Because the control and management of shader programs and the monitoring of these programs are supported by different (independent) hardware threads, they do not interfere with one another. In this approach, shader execution may be monitored without interfering with the execution thereof.

Figure 5:
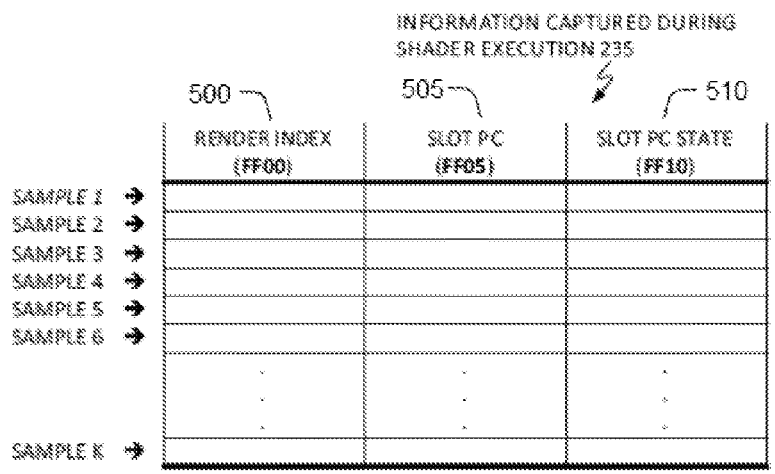
FIG. 5 shows a data capture table in accordance with another embodiment.

In one embodiment the second hardware thread (executing, for example, on control unit 2 150) may be placed in a tight sampling loop in which a sample is obtained for each execution of the loop. Referring to FIG. 5, each sample may include an executing render program's render index 500, program counter contents 505, and the program counter's corresponding state 510. In another embodiment, the render index may not need to be captured. In practice, the second thread may be programmed to execute as few instructions as possible so that it "loops" rapidly. One of ordinary skill in the art will recognize, given this disclosure, that different GPU architectures may necessitate different data capture operations. Even so, enough data should be recorded during each "loop" to permit sampled program counter contents to be mapped to a specific shader program's execution. It will be known that some contemporary GPUs include multiple program counters (each referred to as a "slot"), with each program counter (PC) having its own state register(s). Examples of GPU devices that provide slot program counters include Fermi-based GPUs from NVidia, the ATI Radeon® 9700, and PowerVR graphics architectures from Imagination Technologies. (RADEON is a registered trademark of ATI Technologies U.L.C. of Alberta, Canada. POWERVR is a registered trademark of Imagination Technologies Limited of the United Kingdom.)

Figure 6A:
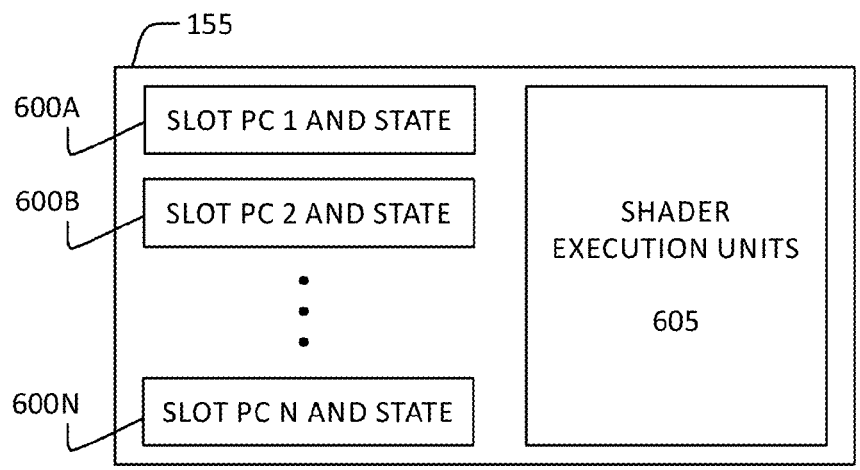
FIG. 6A shows, in block diagram form, an illustrative GPU architecture.
Figure 6B:
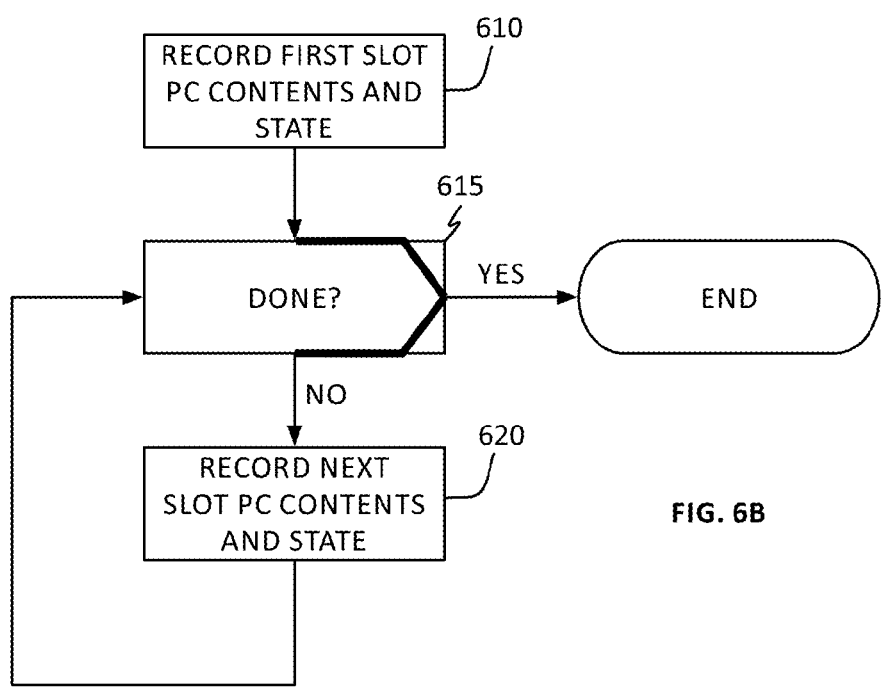
FIG. 6B shows, in flow chart form, a data acquisition loop in accordance with one embodiment.

Referring to FIG. 6A, illustrative GPU functional hardware 155 may include N number of slot PCs and corresponding state, 600A-600N and shader execution units 605. The "tight sampling loop" mentioned above may be implemented as shown in FIG. 6B. There, a first slot PC's contents and state may be read and recorded (block 610) after which a check can be made to determine if sampling has completed (block 615). If sampling is complete (the "YES" prong of block 615), sampling operations may terminate. If sampling is not complete (the "NO" prong of block 615), the next slot PC's contents and state may be recorded (block 620) and the check of block 615 repeated.

Returning again to FIG. 2, once all of the shader programs have been executed, the current sampling run is complete. As previously noted, a "unit" may comprise, for example, a complete frame, one or more render phases, one or more draw-calls. However many shader programs are executed and recorded in accordance with block 235, when they are complete device-side component 120 may send the sampled information to host-side component 110 (block 240) and host-side component 110 may receive same (block 245). In one embodiment, device-side component 120 sends the captured data as two or more distinct blocks of data or tables: one generated by device-side component 120 in accordance with block 225 (e.g., FIG. 4); the other generated by GPU 140/control unit 2 150 in accordance with block 235 (e.g., FIG. 5).

Figure 7A:
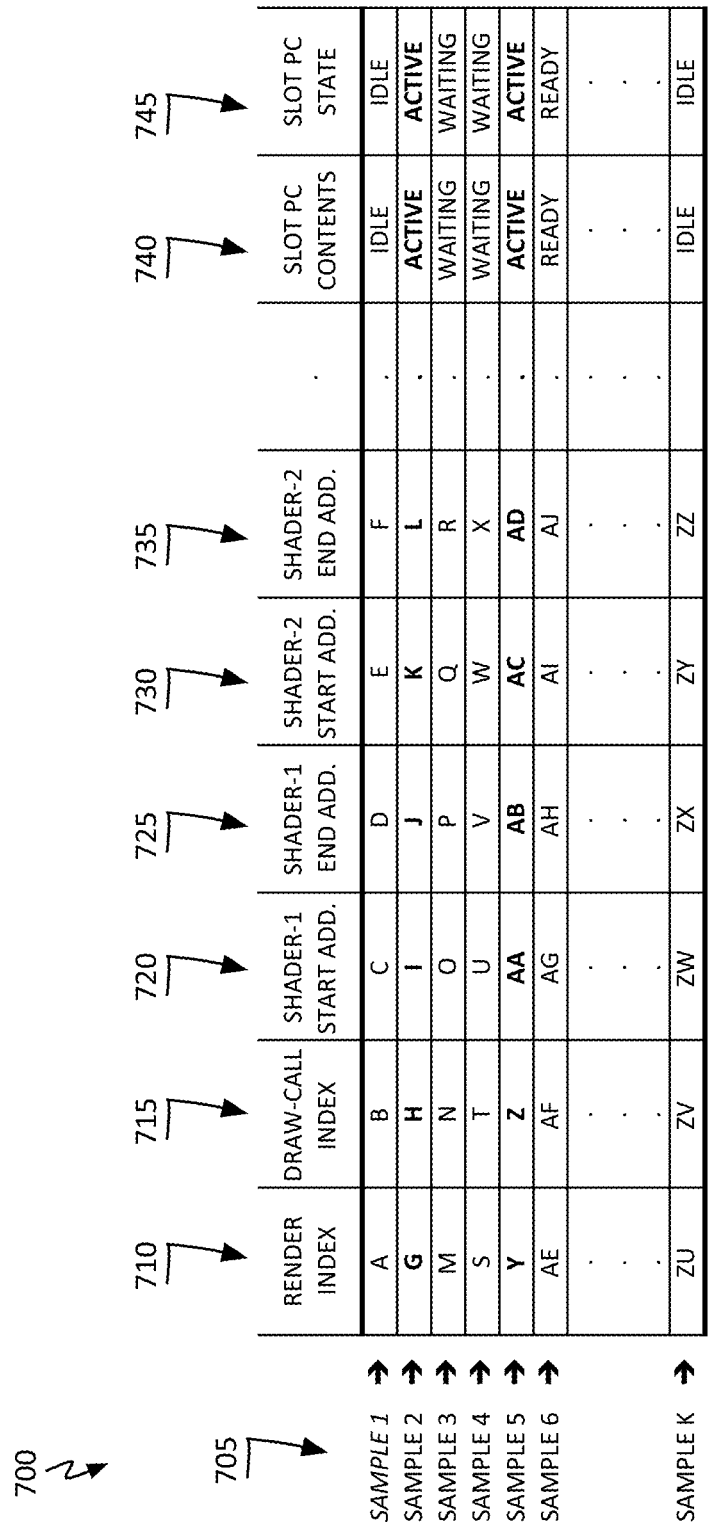

Referring to FIG. 7A, however or wherever assembled, sample data 700 may be obtained. As shown, sample data 700 in accordance with one embodiment may include sample identifier 705, render index 710, draw-call index 715, start and end addresses for each shader in a draw-call 720-735, slot PC contents 740 and its corresponding state 745. Returning once more to FIG. 2, the received sampled data (e.g., FIG. 7A) may be processed by host-side component 110 in accordance with block 250 to identify or determine "real" shader program run-time behavior. In accordance with block 250, and in accord with one embodiment, host-side component 110 may review run-time data 700 to identify those samples corresponding to active PC states (also referred to as "hits"). Referring to FIG. 7B, "active samples" correspond to samples 2 and 5. While the actual indication of "active" may vary from device to device, a typical set of slot PC states may include active, waiting, ready, and idle. An "active" state corresponds to GPU 140 executing a shader program during the time the sample was obtained. A "ready" state can mean that the GPU has all of the resources it needs to execute and is prepared to do so. A "waiting" state can mean that the shader corresponding to the slot PC's content's is waiting for some resource before it can execute (other than shader execution units, e.g., element 605 in FIG. 6A). An "idle" state can mean that the slot PC's content's do not correspond to a shader address that can be executed. It is only during samples corresponding to slot PC active states that the recorded slot PC contents relate to action being taken by GPU functional circuitry (e.g., 155 or 605).

Referring to FIG. 8A, initial data analysis operation 800 may be performed by host-side component 110 as shown (e.g., block 250). After obtaining a first sample from sample data 700 (block 805), a test may be made to determine if it corresponds to an active slot PC state (block 810). If it does (the "YES" prong of block 810), the shader being executed may be identified (block 815) and the fact that the shader was active recorded—indicating a hit (block 820). A check may then be made to determine if there remain samples to interrogate or process (block 825). If at least one sample remains to be processed (the "YES" prong of block 825), a next sample may be obtained (block 830), whereafter operation 800 continues at block 810. Returning to block 810, if the current sample does not correspond to a slot PC with an active state (the "NO" prong of block 810), acts in accordance with block 825 can be executed. Finally, if there remain no more samples to process (the "NO" prong of block 825, initial data analysis operation 800 is complete.

Referring to FIG. 8B, in one embodiment acts in accordance with block 820 may count the number of times each identified shader was sampled while active—resulting in something akin to data table 835, where 1→S represent each unique shader used during generation of the selected frame (e.g., frame 300), and A→Z represent the corresponding shaders' count. By normalizing the count values in FIG. 8B, one may obtain a relative usage value for each shader as shown in FIG. 8C. There, $V_i$ represents the $i^{th}$ shader's value as shown in FIG. 8B. For example, the count value corresponding to shader 3 from FIG. 8B would be represented in FIG. 8C as $V_3$.

Figure 9:
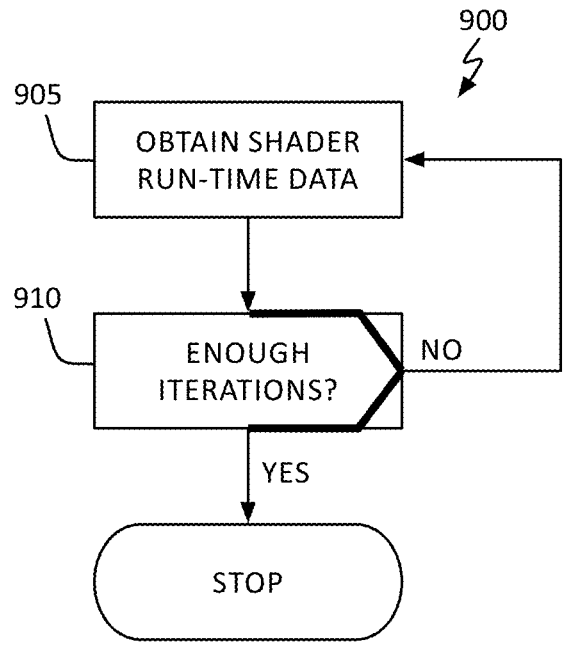
FIG. 9 shows, in flow chart form, a repeated graphics-based program development operation in accordance with one embodiment.

So far, illustrative graphics-based program development operation 200 has been described as being performed once. In practice, this would not generally provide enough "hits" for each shader to accurately measure each shader's relative execution time. Referring to FIG. 9, repeated graphics-based program development operation 900 may first execute operation 200 (block 905) and then determine if a specified number of iterations have been completed (block 910). If additional iterations are deemed necessary (the "NO" prong of block 910), another run of operation 200 may be performed. (It will be recognized and understood by one of ordinary skill in the art, operations 205-215 may only need to take place during the initial or first execution of operation 200 during 900.) If it is determined that a specified number of iterations have been completed (the "YES" prong of block 910), data gathering for this phase of program development may be complete. In one embodiment, the specified number of iterations may be stipulated a priori. In another embodiment, operation 900 may be performed until every shader has received a specified minimum number of hits. Those of ordinary skill in the art will recognize there are manifest ways to determine how many test runs to make.

Figure 10:
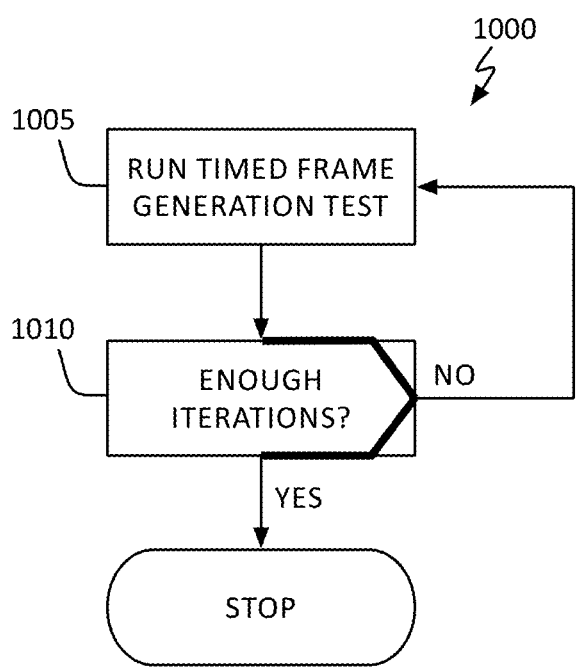
FIG. 10 shows, in flow chart form, a timed frame generation operation in accordance with one embodiment.

Referring to FIG. 10, in another embodiment timed frame generation operation 1000 may also be performed (either before or after operation 200). During timed frame generation operation 1000, the selected frame (e.g., frame 300) may be repeatedly generated and the amount of time taken to generate each iteration determined (block 1005). If additional iterations are desired (the "NO" prong of block 1010), operations resume at block 1005. If sufficient iterations have been run (the "YES" prong of block 1010), timed frame generation operation 1000 is complete. As with FIG. 9, the exact number of iterations may be determined in a number of ways. Operation 1000 permits an average frame generation time to be determined. This, along with each shader's relative run-time in accordance with operation 800, permits a statistical measure of each shader's absolute run-time to be determined.

Information from operations in accordance with this disclosure (e.g., operations 200, 800, 900, and 1000) may be further augmented by including debug labels during shader compilation operations (e.g., during acts in accordance with block 225). If this is done, each sample having a corresponding active state may be mapped back to a line of source code. This, and the timing information provided in accordance with this disclosure, may be used by a program developer to identify not only inefficient shaders, but the instructions within those shader programs that may contribute to this inefficiency.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, acts in accordance with block 235 may also capture GPU utilization metrics if this type of data is available from the GPU. In this way both shader efficiency and the corresponding GPU utilization may be determined. In practice, the amount of memory designated to hold run-time sample data may be fixed. When this is true, the amount of data gathered may exceed or overflow the designated space. In one embodiment, sample data may wrap-around to the start of the designated memory space. This has the benefit of avoiding run-time errors and keeps the most recently captured data. In another embodiment, when an overflow is detected the sample run may be aborted. Further, FIGS. 2, 6B, 8A, 9, and 10 show flowcharts illustrating operations in accordance with the various implementations. In one or more embodiments, one or more of the steps may be omitted, repeated, and/or performed in a different order. Accordingly, the specific arrangement of steps shown in these figures should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:

obtain, by a computer device, from a host computer system, a plurality of shader routines;

record, in a memory of the computer device, a first index and an address for a first shader routine of the plurality of shader routines;

execute, under control of a first hardware thread of a graphics processing unit (GPU) of the computer device, the plurality of shader routines;

monitor performance of the first shader routine that includes logging, in the memory of the computer device, content from a GPU program counter of the GPU and the GPU program counter's state during execution of the first shader routine;

transmit, by the computer device and to the host computer system, the first index and the address in a first block of data; and transmit, by the computer device and to the host computer system, the GPU program counter and the GPU program counter's state in a second block of data, wherein the first index, the address, the GPU program counter, and the GPU program counter's state are indicative of shader performance data.

2. The non-transitory program storage device of claim 1, wherein the instructions to obtain comprise instructions to cause the one or more processors to:

acquire, by a central processing unit (CPU) of the computing device and from the host computer system, source code for the first shader routine; and compile, by the CPU, each of the plurality of shader routines for the GPU.

3. The non-transitory program storage device of claim 2, wherein the instructions to compile comprise instructions to cause the CPU to compile the first shader routine for the GPU with a debug label, and wherein the instructions further cause the one or more processors to detect that the first shader routine has been designated for shader performance monitoring based on the debug label.

4. The non-transitory program storage device of claim 1, wherein:
the first index is indicative of a draw-call index associated with the first shader routine; and
the address is indicative of a start address location for the first shader routine.

5. The non-transitory program storage device of claim 1, wherein the instructions further cause the one or more processors to record, in the memory of the computer device, a render index associated with the first shader routine.

6. The non-transitory program storage device of claim 1, wherein the instructions to monitor comprise instructions to monitor, by a second hardware thread of the GPU, the performance of the first shader routine, and wherein execution of the plurality of the shader routines are not executed on the second hardware thread.

7. The non-transitory program storage device of claim 1, further comprising instructions to cause the host computer system to determine a relative execution time for the first shader routine based on the shader performance data.

8. The non-transitory program storage device of claim 7, further comprising instructions to cause the host computer system to determine one or more times required for the GPU to execute all of the plurality of shader routines based on the relative execution time.

9. A program development method, comprising:
obtaining, by a computer device, from a host computer system, a plurality of shader routines;
recording, in a memory of the computer device, a first index and an address for a first shader routine of the plurality of shader routines;
executing, under control of a first hardware thread of a graphics processing unit (GPU) of the computer device, the plurality of shader routines;
monitoring performance of the first shader routine that comprises logging, in the memory of the computer device, content from a GPU program counter of the GPU and the GPU program counter's state during execution of the first shader routine;
transmitting, by the computer device and to the host computer system, the first index and the address in a first block of data; and
transmitting, by the computer device and to the host computer system, the GPU program counter and the GPU program counter's state in a second block of data, wherein the first index, the address, the GPU program counter, and the GPU program counter's state are indicative of shader performance data.

10. The method of claim 9, wherein the act of obtaining comprises:
acquiring, by a central processing unit (CPU) of the computing device and from the host computer system, source code for the first shader routine; and
compiling, by the CPU, each of the plurality of shader routines for the GPU.

11. The method of claim 10, wherein the act of compiling comprises compiling the first shader routine for the GPU with a debug label, and wherein the method further comprises detecting that the first shader routine has been designated for shader performance monitoring based on the debug label.

12. The method of claim 10, wherein:
the first index is indicative of a draw-call index associated with the first shader routine; and
the address comprises a start address and an end address for the first shader routine.

13. The method of claim 9, wherein the act of monitoring comprises monitoring, by a second hardware thread of the GPU, the performance of the first shader routine, and wherein execution of the plurality of the shader routines are not executed on the second hardware thread.

14. The method of claim 9, further comprising causing the host computer system to determine a relative execution time for the first shader routine based on the shader performance data.

15. The method of claim 14, further comprising causing the host computer system to determine one or more times required for the GPU to execute all of the plurality of shader routines according to the relative execution time.

16. A system comprising:
a device that includes—
a device central processing unit (CPU),
a graphics processing unit (GPU), and
device memory coupled to the device CPU and the GPU;
wherein the device memory comprises instructions to—
cause the device CPU to obtain a plurality of shader routines from a host computer system,
cause the device CPU to compile the plurality of shader routines and record, in the device memory, a first index and an address for a first shader routine of the plurality of compiled shader routines,
cause the GPU to execute, on a first hardware thread, each of the plurality of shader routines,
cause the GPU to monitor performance of the first shader routine by logging, in the device memory, content from a GPU program counter of the GPU and a GPU program counter state during the first hardware thread's execution of the first shader routine,
cause the device to transmit to the host computer system the first index and the address in a first block of data, and
cause the device to transmit to the host computer system, the GPU program counter and the GPU program counter's state in a second block of data, wherein the first index, the address, the GPU program counter, and the GPU program counter's state are indicative of shader performance data.

17. The system of claim 16, wherein the instructions to cause the device CPU to obtain comprise instructions to cause the device CPU to:
acquire, from the host computer system, source code for the first shader routine; and
compile each of the plurality of shader routines for the GPU.

18. The system of claim 17, wherein the instructions to cause the device CPU to compile comprise instructions to cause the device CPU to compile the first shader routine for the GPU with a debug label, and wherein the device memory further comprises instructions to detect that the first shader routine has been designated for shader performance monitoring based on the debug label.

19. The system of claim 16, wherein:
the first index is indicative of a draw-call index associated with the first shader routine; and
the address comprises a start address and an end address for the first shader routine.

20. The system of claim 16, wherein a second hardware thread of the GPU monitors the performance of the first shader routine during the first hardware thread's execution of the plurality of shader routines.

21. The system of claim 16, wherein host computer system comprises a host memory that comprises instructions to cause a host CPU to determine a relative execution time for the first shader routine based on the shader performance data.

* * * * *